19 = VARACTOR
16 = CRYSTAL

34 = CRYSTAL
40 = VARACTOR

56 = CRYSTAL
57 = VARACTOR

56 = CRYSTAL
57 = VARACTOR

United States Patent Office 3,465,265
Patented Sept. 2, 1969

3,465,265
FREQUENCY MODULATOR USING AN N-TYPE SEMICONDUCTOR OSCILLATION DEVICE
Isamu Kuru, Yokohama-shi, Japan, assignor to Tokyo Shibaura Electric Co., Ltd., Kawasaki-shi, Japan, a corporation of Japan
Filed Sept. 9, 1966, Ser. No. 578,262
Claims priority, application Japan, Sept. 13, 1965, 40/55,696; June 8, 1966, 41/36,561
Int. Cl. H03c *3/22*
U.S. Cl. 332—30                                          5 Claims

ABSTRACT OF THE DISCLOSURE

A frequency modulator having a resonance circuit formed of a coaxial type resonator or a waveguide and an N-type Gunn effect semiconductor oscillation device which produces a high frequency signal. A varactor is electromagnetically connected to the resonance circuit to which a frequency modulating signal is applied, thereby varying a resonant condition of the resonance circuit and producing a modulated high frequency signal.

---

This invention relates to a frequency modulating device adapted to effect frequency modulation of high-frequency signals generated by a semiconductor oscillation device comprising an N-type single crystal of gallium arsenside, gallium phosphide, indium phosphide, etc.

In recent years reports have been made on the phenomenon that high-frequency signals are generated from N-type single crystals composed of gallium arsenide, gallium phosphide, indium phosphide and the like when ohmic contacts of tin and the like metal are formed on the opposite ends of the single crystals and a high electric field is applied thereto between said ohmic contacts.

The frequency $f$ of the natural frequency signals generated by the single crystals is generally expressed by an equation $$f = Vd/e \qquad (1)$$

where $e$ represents the length of single crystals in centimeters and $Vd$ the drift velocity in centimeters per second of electrons flowing through the single crystals. The Equation 1 is effective in the case where a resonant circuit is not connected to the single crystal, or where the resonant frequency of the resonant circuit is different from the specific frequency of the single crystal, namely where the resonant circuit is loosely coupled to the single crystal.

It has been confirmed that the relation expressed by Equation 1 well agrees with the results of experiments.

As is obvious from Equation 1, the frequency of the natural frequency signals generated by the single crystals is determined by the length thereof and the drift velocity of electrons so that it is necessary to modulate the drift velociy of electrons in order to modulate said natural frequency signals generated by the single crystals. However, the drift velocity of electrons in single crystals can be represented by the product of the electric field applied to the single crystals and the mobility thereof. Accordingly, under oscillating conditions, the drift velocity of electrons would not be varied to any appreciable extent by the applied electric field so that oscillation frequencies generated by the single crystals could not be varied by the electric field. Thus, in order to provide a large frequency modulation, it is highly desirable to develop a method which is different from a method wherein the electric field applied to the single crystals is varied.

While it has been reported that it is possible to effect frequency modulation of high-frequency signals generated by single crystals a detailed construction of the frequency modulator is not yet reported.

One example of effecting frequency modulation of high-frequency signals generated by single crystals is described below: It has been reported that while a single crystal adapted to generate high-frequency signals was disposed in a casing which comprised a resonance circuit such as a coaxial line, a cavity resonator and the like and a high electric field was impressed between ohmic contacts formed on the opposite ends of the single crystal to generate a high-frequency signal of the desired frequency, if the outer walls and the like of a casing in which said single crystal is disposed were varied mechanically it would be possible to modulate the high-frequency signal generated by the single crystal.

Although the result of experiment mentioned above suggests that it is possible to obtain signals of modulated frequency by deforming the casing which contains the single crystal to vary the resonance frequency of the casing, response speed of such a mechanical method of modulation is so low that it is not suitable for practical use in communication field and the like.

For this reason, notwithstanding its feature of miniature size, an oscillator utilizing a single crystal has not yet been used commercially and it is highly desirable to develop an effective method of modulation.

Accordingly one of the objects of this invention is to provide a novel frequency modulator in which a varactor is utilized to electrically modulate the frequency of high-frequency signals generated by single crystals.

Another object of this invention is to provide a frequency modulating device wherein a single crystal and a varactor are formed as an integral unit to simplify the construction.

The features of the invention which are believed to be novel are set forth with particularity in the appended claims. The invention itself, however, as to its organization together with further objects and advantages thereof, may best be understood by reference to the following description taken in connection with the accompanying drawings, in which:

Figure 1:
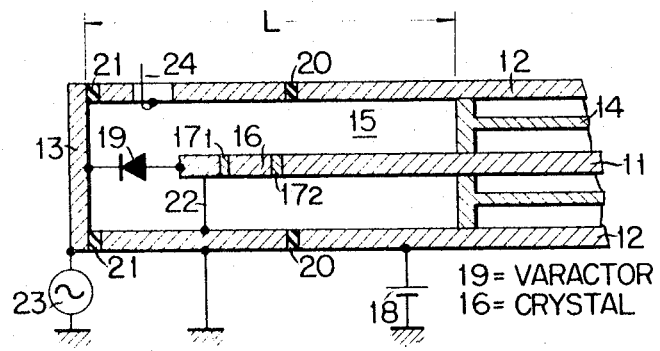
FIG. 1 shows a schematic arrangement of one embodiment of this invention.

Referring now to FIG. 1 of the accompanying drawings, there is shown a coaxial line comprising an inner conductor 11 and a cylindrical outer conductor 12 which surrounds the inner conductor, one end of the coaxial line being short circuited by means of a short circuiting disc 13 as shown. The coaxial line further includes a movable piston 14 to short circuit the inner and outer conductors at a point spaced from the short circuiting disc 13 by a predetermined distance L whereby a resonance circuit is formed which resonates at a frequency determined by said predetermined distance L and other parameters. A semiconductor oscillation element, for example, an N-type single crystal 16 of gallium arsenide, is disposed at a portion of the inner conductor 11 within a casing 15 which comprises said resonance circuit. Ohmic contacts $17_1$ and $17_2$ are provided at opposite ends of the single crystal 16 to which is supplied a high electric field from a source of electric power 18 via ohmic contacts $17_1$ and $17_2$. A varactor, for instance a diode 19, is disposed in said casing of the resonance circuit in series with the single crystal 16, the opposite end of the diode being connected to the short circuiting disc 13, which in turn is connected to a biasing source adapted to supply a negative bias voltage to operate the diode. Annular insulating rings 20 and 21, made, for example, of "Mylar" (polyethylene terephthalate film produced by E. I. du Pont de Nemours & Co., Inc., U.S.A.) are interposed in the outer conductor at desired positions to divide it into sections. A metal wire 22 which interconnects the inner and outer conductors 11 and 12 functions to ground the inner conductor 11 and where the wire is provided for the purpose of establishing a direct current ground it is constructed to act as a high-frequency choke coil by using a fine wire.

With the circuit constituted as above, the single crystal 16 functions to generate a high-frequency signal when it is subjected to the high electric field supplied from a source 18 so that the high-frequency signal having a frequency determined by the distance L between the short circuiting disc 13 and the movable piston 14 and by other parameters can be derived through a terminal 24 provided for one section of the outer conductor 12. In order to effect frequency modulation of the high-frequency signal derived out through the terminal 24, a predetermined signal is applied to the opposite terminal of the diode 19 from a signal source 23.

The capacitance of the diode 19 varies in accordance with the signal supplied from the signal source 23 whereby the resonance frequency of the casing varies corresponding to the signal supplied. An N-type semiconductor device 16 and a varactor 19 are electro-magnetically connected to the resonance circuit having high Q and which is formed of a transmission line such as a coaxial line. Therefore, the oscillating frequency of the N-type semiconductor device can be controlled when the oscillating condition is varied in the high impedance region of the resonant circuit as seen by the oscillation device.

Thus, a high-frequency signal which has undergone frequency modulation in accordance with the signal supplied from the signal source 23 will be supplied via the terminal 24.

Figure 3:
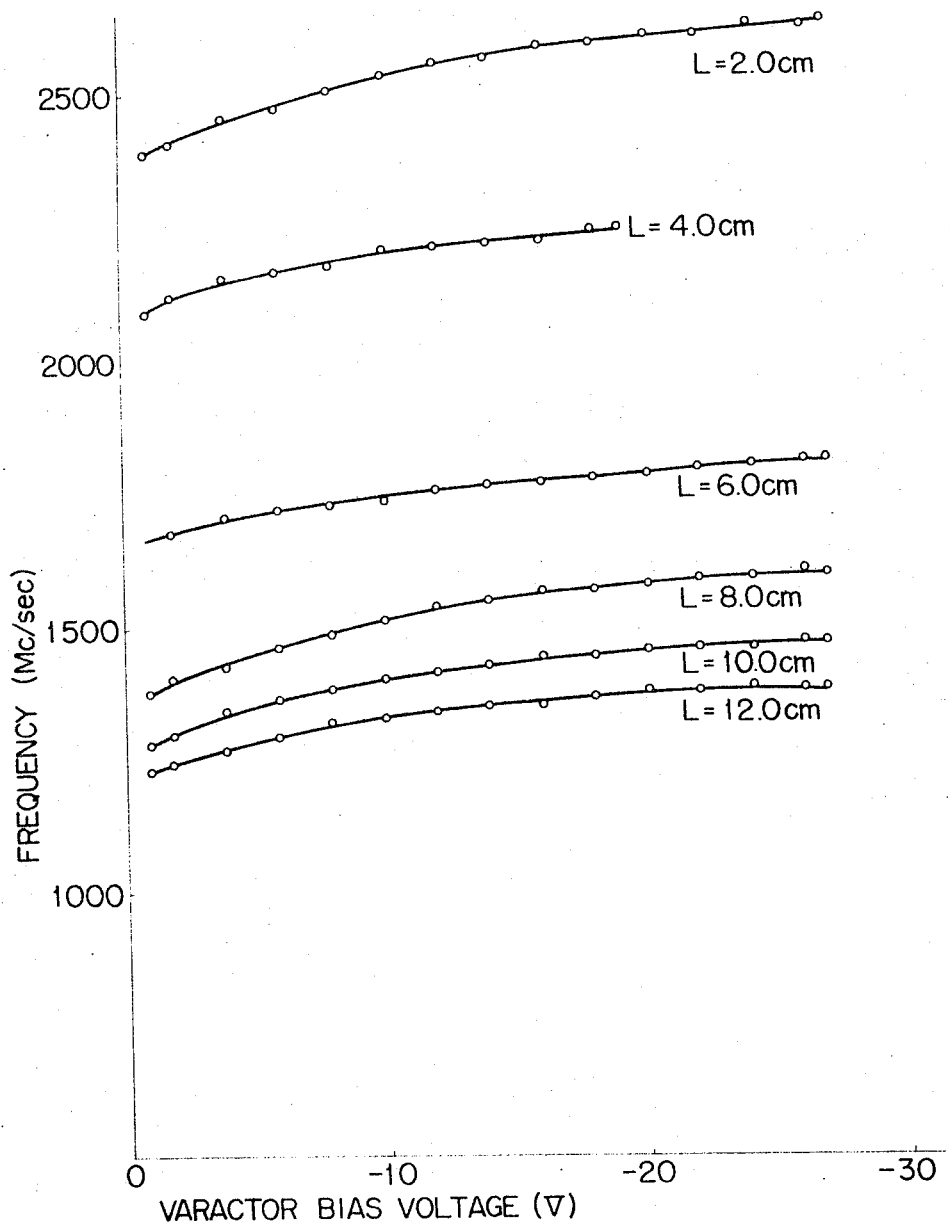
FIG. 3 shows a group of characteristic curves illustrating the results of experiments made on a frequency modulating device embodying the principle of this invention.

The results of experiments made on the frequency modulating device constructed as above are plotted in FIG. 3 wherein the ordinate represents the frequency in megacycle per second (mc./sec.) of the signal derived out of the casing which constitutes the resonance circuit while the abscissa represents the bias voltage in volts (V) supplied to the varactor, the parameter for the various curves being the distance L between the short circuiting disc and the movable piston of said casing as shown in FIG. 1.

As can be clearly noted from the test results shown in FIG. 3, in the case where the parameter $L=2.0$ centimeters, for example, it is possible to effect frequency modulation at such very high efficiencies that the width of frequency variation is about $\pm 120$ megacycles per second for a center frequency of 2500 megacycles per second as will be obvious from FIG. 3, variations of the oscillation frequencies $f$ in dependence of variations of the parameter L are as follows:

| | |
|---|---|
| L=4.0 cm. | $f=2150 \pm 100$ mc. |
| L=6.0 cm. | $f=1700 \pm 70$ mc. |
| L=8.0 cm. | $f=1500 \pm 120$ mc. |
| L=10.0 cm. | $f=1400 \pm 120$ mc. |
| L=12.0 cm. | $f=1300 \pm 100$ mc. |

The variation of the varactor bias voltage ranges between $-1$ v. and $-28$ v.

Figure 2:
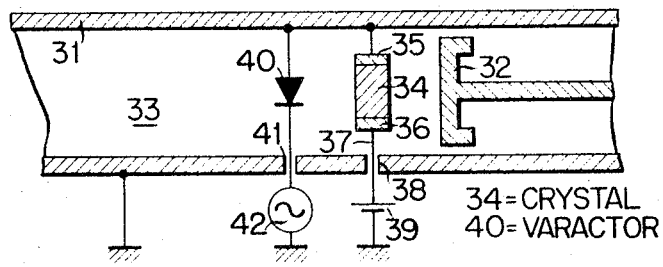
FIG. 2 is a similar view as FIG. 1 of a modified embodiment of this invention.

While in the above embodiment the casing adapted to constitute the resonance circuit is shown as being comprised by a coaxial line it is of course to be understood that a waveguide, a cavity resonator or other resonant circuits which will constitute a transmission line can also be utilized as the casing of the resonance circuit. FIG. 2 shows a modified embodiment of this invention wherein the casing is comprised by a waveguide.

More specifically, one end of a rectangular waveguide 31 with the other end opened is short circuited by means of a suitable movable piston 32 to define a casing 33 of a predetermined dimension so as to provide a resonance circuit.

Within the casing 33 is disposed a single crystal 34 of N-type gallium arsenide, for instance, the opposite ends thereof being formed with ohmic contacts 35 and 36, made of tin for example. One of the ohmic contacts 35 is connected to the inner wall of the waveguide that comprises the casing 33 whereas a lead wire 37 connected to the other ohmic contact 36 is led out of the casing 33 via a by-pass condenser 38. Further the single crystal 34 is subjected to a high electric field which is supplied thereto from a source of electric power 39 via ohmic contacts 35 and 36 formed on the opposite ends thereof. A varactor, for example a diode 40, is disposed in the casing 33 in series with the single crystal 34, one terminal of the diode 40 being connected to a biassing and signal source 42 which reversely biasses the diode 40 via a by-pass condenser 41 extending through the wall of the waveguide. With the construction as above described, when a predetermined signal generated in the signal source 42 is supplied across the diode 40, the capacitance thereof would vary, thus varying the resonance frequency of the casing 33. As a consequence, the casing supplied to outside through the opening end of the waveguide a signal which has undergone frequency modulation in accordance with the predetermined signal supplied from the signal source 42.

Thus, this invention provides a very simple device capable of effecting frequency modulation generated by a single crystal by a unique utilization of a miniature single crystal. The frequency modulating device of this invention is suitable for various microwave apparatus.

According to this invention although it is possible to provide high-frequency modulation by electrical means it is necessary to independently mount very small semiconductor device and reactance element in the resonance casing, thus resulting in complicated construction.

Figure 4:
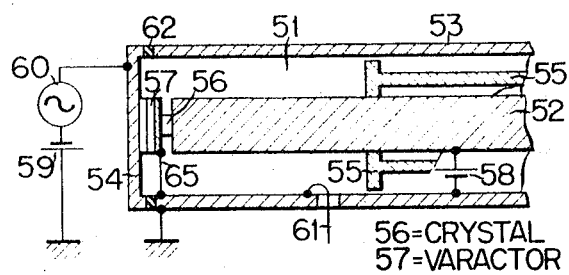
FIG. 4 is a diagrammatic representation of a still further modification of this invention.
Figure 5:
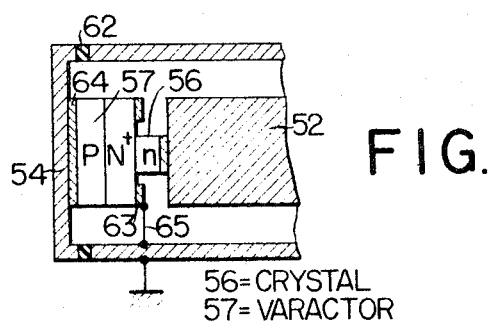
FIG. 5 is a sectional view of a portion of another modification of this invention.

FIGS. 4 and 5 show other embodiments of this invention which are advantageous in that not only mounting of reactance element is simplified but also many other merits are provided.

A casing 51 which forms the resonance circuit of this invention is comprised by a coaxial type resonator including an inner conductor 52 and an outer conductor 53 surrounding the inner conductor. One end of the casing 51 is terminated by a short circuiting disc 54 and the other end is partitioned by a movable piston 55 which is slidably arranged between the inner and outer conductors 52 and 53. At the inner end of the conductor 52 is disposed a semiconductor oscillation device which generates a high-frequency signal under a high electric field, for example an N-type single crystal 56 of gallium arsenide, gallium phosphide, indium phosphide and the like, said oscillation device being connected to the inner conductor 52 via an ohmic contact, not shown. Likewise, the opposite side of the single crystal 56 is also provided with an ohmic contact.

A varactor 57 having a P-N junction and integrally formed with the single crystal 56 is interposed between the short circuiting dics 54 and the single crystal 56. The varactor 57 and the single crystal 56 are electromagnetically connected to the coaxial type resonator and a lead line 65 connected to an electrode of said varactor is grounded through the outer conductor 53. A voltage of the desired value is impressed to the single crystal from a source of potential 58 via the ohmic contact on one end of the single crystal. Signals acting as reverse bias are supplied to the varactor 57 from a source of potential 59. Further, a modulation signal is supplied from a modulation signal source 60 to the reverse biased varactor 57 in a superposed relation.

In the construction described above, the single crystal 56 operates to generate a high frequency signal of the desired frequency under a high electric field, but application of the modulating signal from the source 60 across the varactor 57 results in the variation of the capacitance of the varactor whereby the resonance frequency is varied in accordance with the variation in the modulating signal. In this way, a frequency modulated signal is sent out from the casing 51 via a terminal 61 which is formed at a portion of the outer conductor 53.

An annular insulator 62 made of "Mylar" for instance, is provided to insulate adjacent sections of the outer conductor 53 of the coaxial type oscillator.

In accordance with this invention, as a semiconductor oscillation device and a varactor having a P-N junction are constructed as a unitary structure it is very easy to handle them. Further, the heat generated in the semiconductor oscillation device is dissipated through the varactor having the P-N junction so the characteristics of the modulating device are improved.

Further, incorporation of an extremely small oscillation device to a relatively massive semiconductor element permits the former to be readily mounted in the casing.

Alternatively the semiconductor oscillation element may be constructed as shown in FIG. 5. With this construction the spacing between the surface of N+ region, for example, of the varactor and the inner conductor 52 is increased with corresponding decrease in the chance of discharge between the inner conductor 52 and the varactor 57. The $n$ element designated by the reference numeral 56 is an N-type semiconductor device.

The oscillation device may be formed by any appropriate technique such as by the epitaxial growth method, on a previously formed varactor including a P-N junction, as shown in FIG. 5, the order of arrangement of the P-type region and the N-type region in the varactor may be reversed. Further ohmic contacts 63 and 64 are formed on the opposite surfaces of the varactor 57 connected between the inner conductor 52 and the short circuiting disc 54 in order to supply the signal to the device.

In the case where the oscillation device and the varactor are formed as an integral unit as above described it is of course to be understood that the casing adapted to form a resonance circuit is not limited to a coaxial type resonator but may be a cavity resonator and the like, and that an oscillation unit and a varactor which are integrally formed may be used with such construction that they are encapsulated by a single cap.

I claim:
1. A frequency modulator using an N-type semiconductor oscillation device comprising:
   a resonance circuit formed of a transmission line;
   an N-type semiconductor oscillation device electromagnetically connected to said resonance circuit,
   a first power source for applying a high electric field to said N-type semiconductor device to cause a high frequency signal to be generated;
   a varactor electromagnetically connected to said resonance circuit;
   a second power source for applying a reverse bias to said varactor;
   a signal source supplying a modulating signal to said varactor; and
   means for deriving a frequency modulation signal obtained by the variation of a resonant condition, said resonant condition varying in accordance with the variation of the reactance of said varactor in accordance with said modulating signal.

2. The frequency modulator according to claim 1 wherein said semiconductor oscillation device and said varactor are constructed as an integral unit, said semiconductor oscillation device being epitaxially grown on a surface of said varactor.

3. The frequency modulator according to claim 1 wherein said resonance circuit includes a coaxial line comprising an inner conductor and an outer conductor and wherein said varactor and said semiconductor device are respectively connected to a portion of said inner conductor to form a series connection.

4. The frequency modulator according to claim 1 wherein said resonance circuit is comprised of a waveguide having one end thereof short circuited.

5. The frequency modulator according to claim 1 wherein said N-type semiconductor oscillation device is of gallium arsenide.

References Cited

UNITED STATES PATENTS

| | | |
|---|---|---|
| 3,141,141 | 7/1964 | Sharpless. |
| 3,168,713 | 2/1965 | Van Kessel. |
| 3,365,583 | 1/1968 | Gunn. |

OTHER REFERENCES

Newell et al.: "Measuring Eyeball Pressure With a Crystal Oscillator," Sept. 8, 1961, Electronics, pp. 64–65.

Kuru: "Frequency Modulation of Gunn Oscillator" Proc. of the IEEE, October 1965, pp. 1642–1643.

ALFRED L. BRODY, Primary Examiner

U.S. Cl. X.R.

332—52; 331—107, 36; 317—234; 307—299, 320